United States Patent
Pais et al.

(10) Patent No.: US 9,544,861 B1
(45) Date of Patent: Jan. 10, 2017

(54) APPARATUS AND METHOD FOR MANAGING TRANSMITTER TEMPERATURE AND POWER WITHIN A GROUP OF COMMUNICATION DEVICES

(71) Applicant: MOTOROLA MOBILITY LLC, Chicago, IL (US)

(72) Inventors: Martin R. Pais, North Barrington, IL (US); Morris Bowers, Grayslake, IL (US); Phillip A. Green, Grayslake, IL (US); Gary J. Cunningham, Western Springs, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/800,720

(22) Filed: Jul. 16, 2015

(51) Int. Cl.
| | |
|---|---|
| *H04M 7/00* | (2006.01) |
| *H04W 52/52* | (2009.01) |
| *H04W 76/02* | (2009.01) |
| *H04W 4/08* | (2009.01) |
| *H04W 52/24* | (2009.01) |
| *H04W 52/38* | (2009.01) |

(52) U.S. Cl.
CPC .............. *H04W 52/52* (2013.01); *H04W 4/08* (2013.01); *H04W 52/241* (2013.01); *H04W 52/383* (2013.01); *H04W 76/023* (2013.01)

(58) Field of Classification Search
CPC ........ H04W 4/008; H04W 4/06; H04W 4/005; H04W 4/08; H04W 84/18; H04W 28/0215; H04W 72/121; H04W 72/1263
USPC ........ 455/522, 69, 68, 127.1, 500, 517, 508, 455/445, 550.1, 426.1, 426.2, 41.1–41.3, 455/403, 422.1, 458, 575.1, 67.11, 455/423–425, 518, 519, 127.2–127.5; 370/328, 329, 310, 338, 370/332, 318
See application file for complete search history.

(56) References Cited

U.S. PATENT DOCUMENTS

| | | | |
|---|---|---|---|
| 6,553,228 B1 | 4/2003 | Kotzin | |
| 7,024,196 B1 | 4/2006 | Kotzin | |
| 2012/0176976 A1* | 7/2012 | Wells | H04W 52/0219 370/329 |
| 2016/0088588 A1* | 3/2016 | Uusitalo | H04W 68/02 455/458 |

OTHER PUBLICATIONS

Wi-Fi Alliance Technical Task Group, Wi-Fi Neighbor Awareness Networking (NAN), Wi-Fi NAN Technical Specification Contribution, Version 0.0 (TG Baseline r16), May 29, 2014, all pages.
Jian Qiao et al.: "Enabling Device-to-Device Communications in Millimeter-Wave 5G Cellular Networks," Millimeter-Wave Communications for 5G, IEEE Communication Magazine, Jan. 2015, all pages.
Moshsen Nader Tehrani, et al.: "Device-to-Device Communication in 5G Cellular Networks: Challenges, Solutions, and Future Directions", 5G Wireless Communications Systems: Prospects and Challenges, IEEE Communications Magazine, May 2014, all pages.

* cited by examiner

Primary Examiner — Keith Ferguson

(57) ABSTRACT

A method and apparatus for wireless communication device operation comprises receiving one or more metrics from at least two members of a group whose members are wireless communication devices. The members of the group have agreed to share resources within the group and have their wireless connections controlled by the WCD. The wireless connections of the at least two members are managed, based on the one or more metrics, to optimize performance of the at least two members. The one or more metrics comprise at least one temperature based metric.

17 Claims, 5 Drawing Sheets

APPARATUS AND METHOD FOR MANAGING TRANSMITTER TEMPERATURE AND POWER WITHIN A GROUP OF COMMUNICATION DEVICES

FIELD OF THE INVENTION

The present invention relates generally to communication devices, and more specifically to managing transmitter power consumption and circuit temperatures of communication devices operating within a group of communication devices.

BACKGROUND

Some wireless communication devices have a capability of communicating in more than one manner, such as by one or more wide area communication networks, by Wi-Fi® RF protocol, and/or by Bluetooth® RF protocol. Some of these wireless communication devices are capable of automatically selecting from among the available manners of communication to reduce their resource usage, such as using a Wi-Fi communication link when one is available, which may reduce power consumption and/or circuit operating temperatures.

Wireless communication devices are sometimes organized into groups for a variety of purposes. For example, a group may be formed of communication devices that are participating in a cellular phone system provider's family plan or communication devices that are used by employees in a business.

Temperatures are sensed at a number of locations within some wireless communication devices. These locations may include a temperature measured at a point proximate to a radio frequency power amplifier (RFPA) within the wireless communication device. This temperature and others may be used to manage the radiated power output of the RFPA.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in FIG. 1 is a system block diagram that shows a portion of a communication environment, in accordance with certain embodiments.

Figure 1:
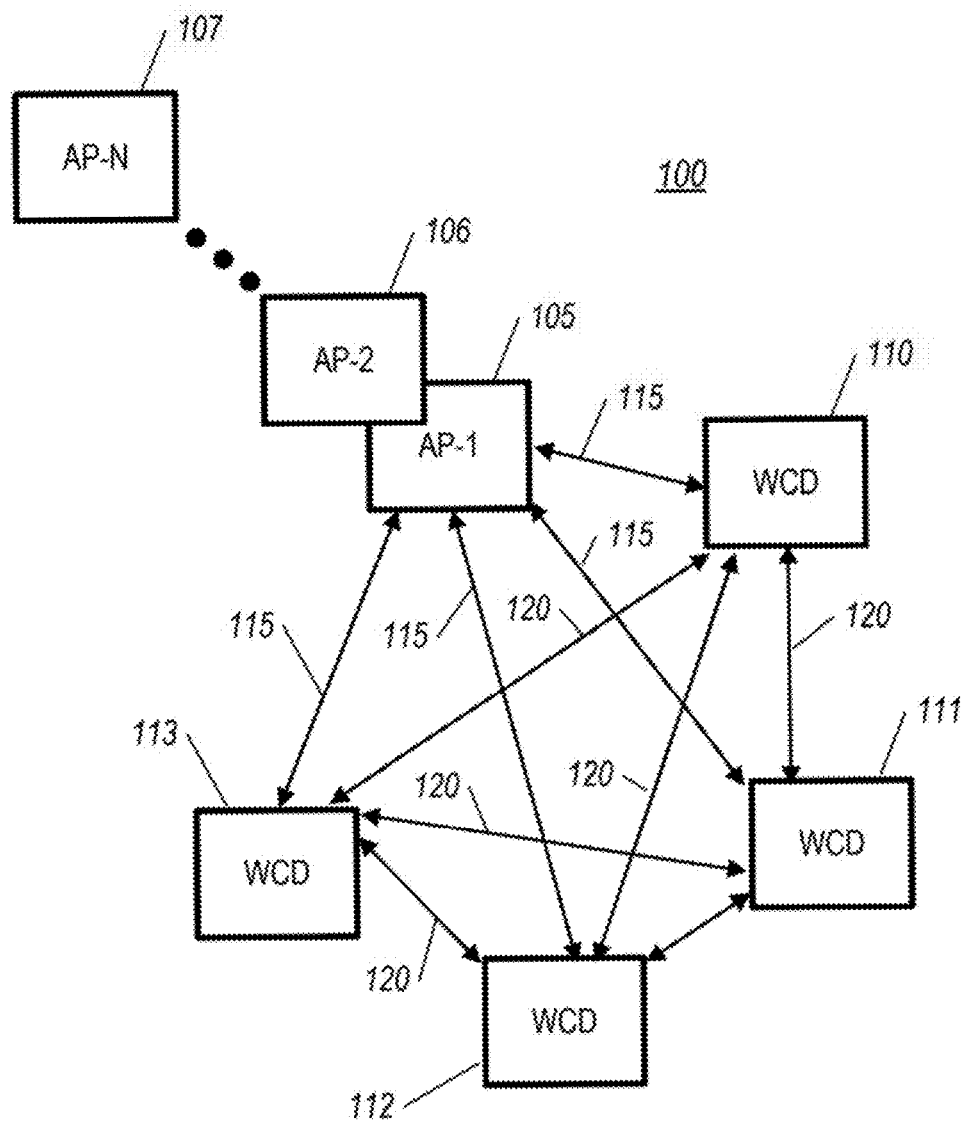

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to sharing resources within a group of wireless communication devices (WCDs). Generally speaking, a connectivity management entity (CME) is allowed to manage the wireless connections of the WCDs. As just one example, an internet connection that has been established by one of the WCDs by direction of the CME may then be used by other WCDs in the group, using member-to-member wireless connections such as Wi-Fi or Bluetooth that are established under direction of the CME. The CME may reside in one of the WCDs.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "including," "having", or any variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a", "includes . . . a, or "having . . . a" does not, without more constraints, preclude the existence of additional identical elements in the process, method, article, or apparatus that comprises, includes, or has the element. The term "coupled" as used herein is defined in the sense that information or energy is passed from one electrical device to another, not necessarily directly, and not necessarily without delay or temporary storage.

Referring to FIG. 1, a system block diagram 100 shows a portion of a communication environment, in accordance with certain embodiments. The communication environment comprises one or more access points 105-107, and some wireless communication devices (WCDs) 110-113 that comprise a portion of the active WCDs that are operating in the communication environment over communication links 115. Each of the access points 105-107 is a wireless node of a network, each of which wireless node can provide a voice and/or internet connection to at least one of the WCDs 110-113. The access points may be, for example, a base station of any cellular system, enterprise system, or a wireless node of a Wi-Fi network. The WCDs 110-113 are a portion of a group of WCDs that are being operated by a group of users. At least some of the WCDs of the group may connect to the access points 105-107 as needed using links 115. Each WCD of the group may be able to connect to other wireless systems. Each WCD may further include member-to-member connection facilities to connect to other WCDs using one or more of a local area network, for example a Wi-Fi network, or personal area network, for example a Bluetooth network or Near Field Communications (NFC), or a mesh network, for example, a Zigbee® network, or a peer-to-peer capability, such as that being defined for Long Term Evolution (LTE) systems. Each of the WCDs 110-113 of the group or the user of the WCDs of the group have agreed, or agree during execution of the unique techniques described herein, to share resources under the control of a connectivity management entity (CME). The CME comprises an application that is run by one of the WCDs in the group of WCDs, or by a network processing device that is in a fixed network of a wide area network, but is a member of the group of WCDs as a result of having a resource sharing agreement with the other members. Each of the WCDs 110-113 of the group are capable of communicating with the CME, which in some instances may be by using links through another WCD or other WCDs. WCDs 110-113 may be portable, personal, vehicular, mobile, or fixed WCDs. The agreement to share resources by a member WCD is a setting that may represent a legal action by the owner of the WCD that is an agreement to share the WCD's resources. In some embodiments, the user of a WCD may have rights to change the setting of the agreement to share. The owner in some embodiments may not be the user of the WCD. For example, the owner may be a parent of a user or the user may be an employee of a business owner.

Generally speaking, the unique techniques described in further detail below provide that wireless connections of each WCD are controlled by the CME. The CME is designed to control the wireless connections of each WCD to optimize, within the group, radio frequency (RF) power consumption and upload information bandwidth. In the process, the average battery discharge rates are typically lowered and RF power amplifier device temperatures are reduced and reliabilities are increased. In some cases, a particular WCD may be selected to perform information upload for one or more other WCDs. In many cases, the routing of the information will be unnoticed by the users of the WCDs. The group of WCDs may be of any quantity of WCDs that meet the criteria stated (agreement to have their wireless connections controlled by a CME and share resources).

The optimization is performed using temperature based metrics and communication link metrics. Examples of temperature based metrics include, but are not limited to, such items as a radio frequency power amplifier (RFPA) temperature, an RFPA temperature threshold, an RFPA temperature rate of change, an RFPA temperature characterization, an RFPA temperature characterization identifier, and/or an RFPA temperature cutback duration. The wireless connections that are controlled are characterized using communication link metrics, examples of which include, but are not limited to, data rate, quality of service, bandwidth, and data limits. These communication metrics may be for uplink and downlink wireless connections. The communication and temperature based metrics are not all independent of each other, For some embodiments, performance is optimized by a CME operating within a wide area network instead of one the WCDs of the group of WCDs. This may be advantageous in a situation in which a WCD is pushing data at a lower speed to a server that is very busy. The network can use the metrics to determine that the RFPA temperature is increasing and direct the WCD to change servers. The control of wireless connections among the WCDs in a group and the wireless connections between the WCDs and one or more access points is determined by an optimization routine of the CME that monitors and controls the connections, which may change over time, sometimes quickly. Optimization can be based on machine learning, artificial intelligence, and/or user prioritization.

Figure 2:
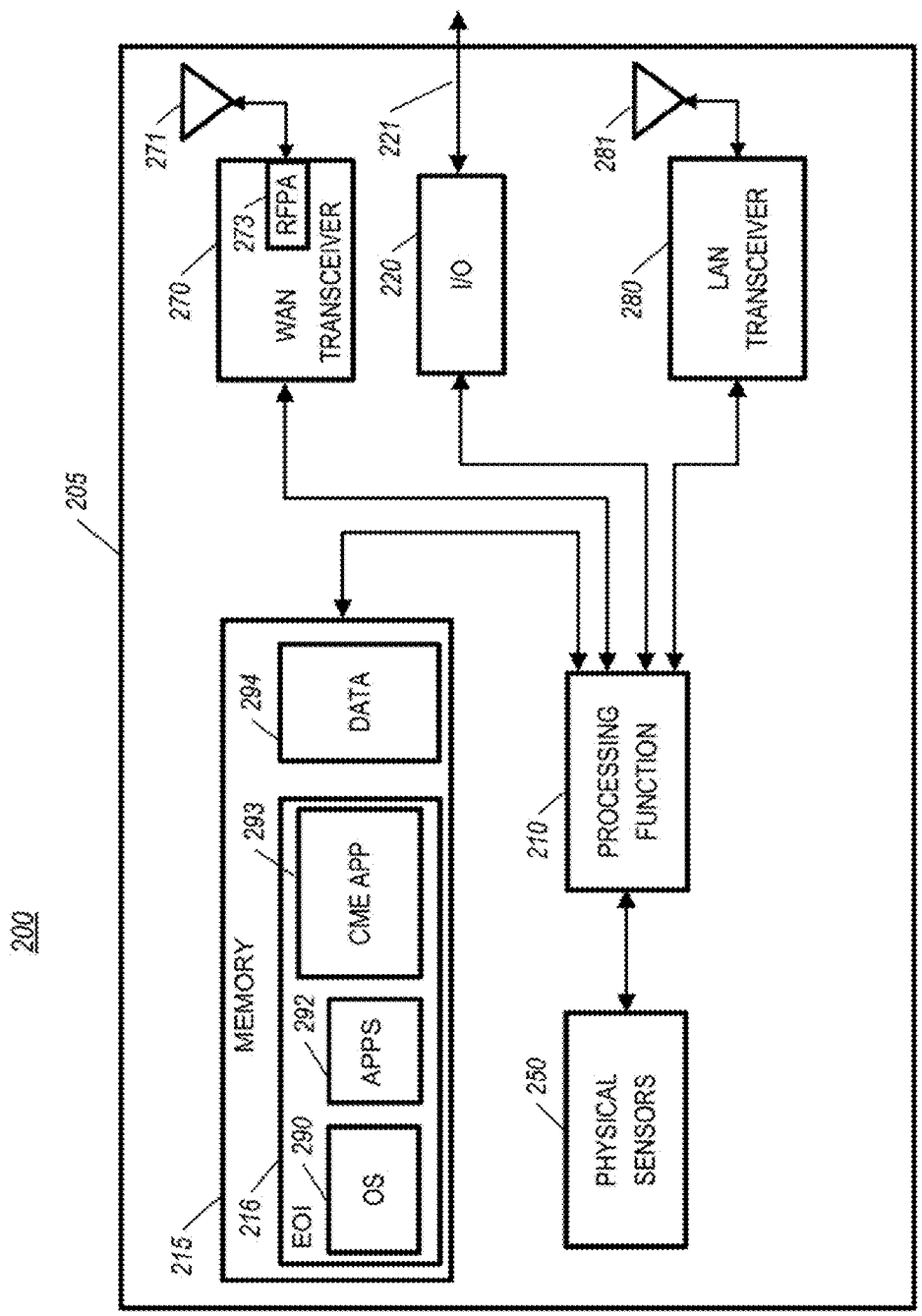
FIG. 2, is a functional block diagram that shows a wireless communication device (WCD), in accordance with certain embodiments.

Referring to FIG. 2, a functional block diagram 200 shows a WCD 205, in accordance with certain embodiments. The WCD 205 includes a processing function 210, a memory 215, input/output interface circuitry 220, and one or more physical sensors 250. The processing function 210 comprises one or more processing devices (not shown in FIG. 2), each of which may include such sub-functions as central processing units (cores), cache memory, instruction decoders, just to name a few. The processing function 210 executes program instructions which may be located within memory in the processing devices or may be located in a memory 215 external to the processing function 210, to which the memory 215 is bi-directionally coupled, or in a combination of both. The memory 215 may be any combination of hardware that stores programming instructions, including RAM, ROM, EPROM, EEPROM, and parts of an ASIC. The processing function 210 may, in some embodiments, be further coupled to a radio wide area network receive-transmit function (also referred to as the radio network transceiver or wide area RF modem) 270 that is coupled to a radio antenna 271, which may be internal or external to the electronic device 205. The wide area RF modem 270 includes a radio frequency power amplifier (RFPA) 273. A second wide area network transceiver may be included (not shown in FIG. 2). The wide area network transceiver or transceivers may be for cellular, enterprise, public safety, or other wide area systems. The processing function 210 may also be coupled to a local area network transceiver 280 with associated antenna 281. Additional local or personal area network or mesh network transceivers may be included (not shown in FIG. 2). The local, personal, and mesh network transceivers may be for Wi-Fi, Bluetooth, Zigbee, or other local area networks, personal area networks, or local mesh networks that can provide data or voice communication connections between two or more WCDs without involving wide area network costs and overhead. The wide area RF modem 270 may offer a peer-to-peer capability. In this document these are called member-to-member communications. The electronic device 205 has a power source (not shown in FIG. 2) that is a rechargeable battery in some embodiments. In some embodiments one or more of the radio transceivers themselves comprise one or more processors and memory, and may also comprise circuits that are unique to radio protocols defined by an industry standard. In some embodiments, the WCD 205 represents functions that are found within a fixed network of a wide area network system. In these embodiments, the WCD 205 may have a power source other than a battery, may lack member-to member wireless connection capability, may have very little human interface hardware, and the processing functions and transceiver functions may be within different equipment.

The functional block diagram 200 (FIG. 2) shows the executable operating instructions (EOI) 216 being stored in the memory 215, external to the processing function 210, but as noted above, the memory 215 may be within or shared with the one or more processing devices. The memory 215 also stores data 294. The EOI 216 of the electronic device 205 includes groups of instructions identified as an operating system (OS) 290, software applications 292 (including software utilities), and a software application called the connectivity management entity application (CMEA) 293. The applications 292 may include conventional human interface applications such as game applications, navigation application, video processing applications, transceiver interface, and sensor processing applications. The combination of the processing function 210, the EOI 216, and the data 294 may also be referred to as the processing system of the electronic device 205. Some applications may use memory that is located externally to the WCD, such as in a network server, and some applications that control aspects of the WCD, and may appear to be resident in the WCD, may be executed partially or wholly externally, such as in a network server. The processing function 210 may include input/output (I/O) interface circuitry and/or may be coupled, as shown in FIG. 2, to separate I/O interface circuitry 220 that is controlled by the processing function 210. The I/O interface circuitry 220 provides for communications between the processing system and some hardware elements of the electronic device, including human interface components, such as keys, displays, and to wired I/O 221 such as that which uses standard hardware and software protocols Universal Serial Bus, 1394, or Ethernet. The processing system is coupled to the physical sensors 250 via the processing function 210. The physical sensors 250 may include one or more temperatures sensors, such as a processor temperature sensor, an RFPA temperature sensor, and a WCD enclosure temperature sensor, which may be proximate the display, and a battery state of charge sensor that indicates a remaining charge in the main battery of the WCD.

The processing system runs the CMEA 293, which controls issues commands and receives information using the transceivers in the WCD 205 to manage the wireless connections of other WCDs. Thus, the CME comprises the computer instructions of CMEA 293 and the hardware (e.g., the processing system and transceiver 270) to communicate with other WCDs. Portions of the CME may run on a server external to the WCD, such as a cloud server. The portions may include most of the functions of the CME. Some other applications 292 may be uniquely altered to provide certain functions cited below. For example, when the CME is in another WCD, the CME must be able to control the wireless connections of the WCD 205 and acquire metrics of the WCD 205, and therefore some transceiver interface applications of the applications 292 and/or operating instructions in one or more of the radio transceivers, such as WAN transceiver 270 and LAN transceiver 280 may be uniquely altered to carry out commands of the CME and collect metrics needed by the CME. The altered parts of applications 292 may be considered to be parts of the CME. The WCD 205 is capable of performing the functions described below with reference to FIGS. 3-6.

Figure 3:
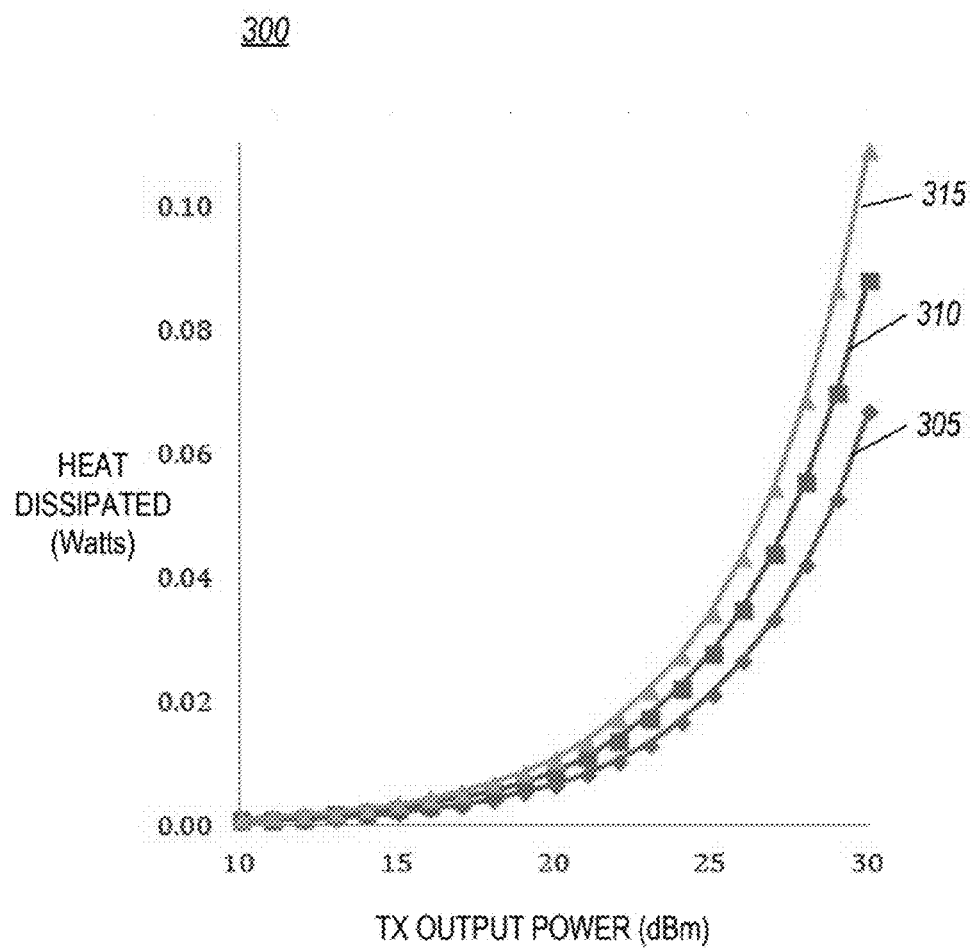
FIG. 3 is a graph that shows plots of radio frequency power amplifier heat emission versus radio frequency transmitted power, in accordance with certain embodiments.

Referring to FIG. 3, a graph 300 shows plots of heat dissipated, in Watts, by a radio frequency power amplifier (RFPA) versus radio frequency power transmitted by the RFPA in dBm (decibels of power referenced to one milliwatt). The RFPA is representative of the RPFA 273 (FIG. 2) used in WCDs that operate in current cellular networks. Plot 305 is for the RFPA when it is operated at a carrier frequency of 1 GHz. Plot 310 is for the RFPA when it is operated at a carrier frequency of 2 GHz. Plot 315 is for the RFPA when it is operated at a carrier frequency of 2.5 GHz. When the WCD is operating near the edge of a cell, the RFPA may be commanded to use 30 dBm of radiated power so that a reasonable quality of service is achieved. At 2.5 GHz, it can be seen that the power dissipated is 0.10 Watts. It will be appreciated that the temperature of the RFPA rises quickly, such as within tens of seconds. Nearby components in the WCD become warm. A significant portion of the battery current drain is used to generate the 30 dBm of radiated power. If the RFPA is operated at this power level continuously, the temperatures at the RFPA or at other component in the WCD may reach a temperature at which cutback procedures may be implemented, for example because the enclosure temperature of the WCD becomes uncomfortable to a user when it gets to the range of 40-45 degrees centigrade. Operating the RFPA at 30 dBm also may affect the MTBF (mean time between failures) of the RFPA, but since RFPAs are typically designed to operate at high temperatures, such as 150 degrees centigrade, the effect of the RFPA temperature on other components is often the more important aspect. These undesirable effects are lessened as the radiated power is decreased. However, reducing the radiated power of the RFPA likely introduces the undesirable effect of reduced quality of service when the WCD is at the edge of a cell. One method of managing the RF power output of the RFPA is for a WCD to use an algorithm in which the RF power output is simply set to a level needed for a desired data rate and quality of service and then cut the RF power output back when maximum threshold temperature limits are reached for the RFPA or other components, and inform the CME of the cutback. This method could require quick reaction by the CME to select another WCD in order to optimize performance within the group as a whole, which may be a good approach in some embodiments. In other embodiments, optimal management of the selection of another WCD to take over some transmission functions of a WCD that is headed for a cutback may involve the use of an algorithm to calculate a (predicted) cutback duration for each WCD based on the history and present values of several metrics. For example, by knowing the present RFPA temperature (a temperature proximate the final power generating portion of the RFPA), the current rate of change of the RFPA temperature, and the present RFPA output power, a duration at the end of which the RFPA temperature will reach an RFPA maximum threshold temperature can be determined from the plots in FIG. 3 (which is a metric), and metrics comprising the mass of the RFPA and the specific heat of the RFPA.

By knowing additional metrics that include a thermal coefficient between the RFPA and the rest of the WCD and the present temperature of the WCD ($T_{WCD}$), a cutback duration can be calculated. By knowing additional metrics that include the thermal coefficient $\theta_{RFPA}$ from the RFPA to the rest of the WCD, and the present temperature representative of the WCD, one can calculate the predicted temperature of the RFPA, $T_{RFPA}$, as $$T_{RFPA} = \theta_{RFPA} * RFPA_{HeatLoad} + T_{WCD},$$

wherein $Heat_{Load}$ is the heat dissipated by the RFPA in FIG. 3 and $T_{WCD}$ is a temperature that is representative of the WCD and may be determined from a specific point measurement, such as the back of the display, or determined as a combination of temperatures of more than one component (e.g., display and processor). In situations where there is a change in the power demands on the RFPA, we would expect a gradual rise in the RFPA and WCD temperatures. If the heat load is excessive, then it would be imperative that the CMEA be able to predict the time it will take to reach the cutback temperature so as to plan the transition to another WCD in the group. This time to cutback, or cutback duration, is then calculated for the RFPA as:

$$TimetoCutback = \frac{mC_P(T_{CutBack} - T_{Present})}{(RFPA_{HeatLoad} - Heat_{Loss})}$$

wherein m is the mass of the RFPA, $C_p$ is the specific heat of the RFPA, and $Heat_{Loss}$ can be determined from the heat dissipation determined from FIG. 3, the thermal coefficient, $\theta_{RFPA}$, a thermal coefficient from the case of the RFPA to the rest of the WCD, $\theta_{RFPA-RestofWCD}$, and the ambient temperature. $\theta_{RFPA-RestofWCD}$ is determined experimentally.

In summary, a cutback duration is determined based on metrics that include one or more of the present temperatures of one or more components of the WCD, the present rate of temperature change of one or more components of the WCD, the maximum temperature thresholds of one or more components of the WCD, a characterization of the power load of the RFPA versus the RF power output of the RFPA, and a thermal coefficient for the RFPA to the rest of the WCD. Using these additional cutback temperatures optimizes the management of the WCDs. If the other components are not at steady state temperatures, then present rates of temperature change are needed to make a better predication of cutback durations.

Figure 4:
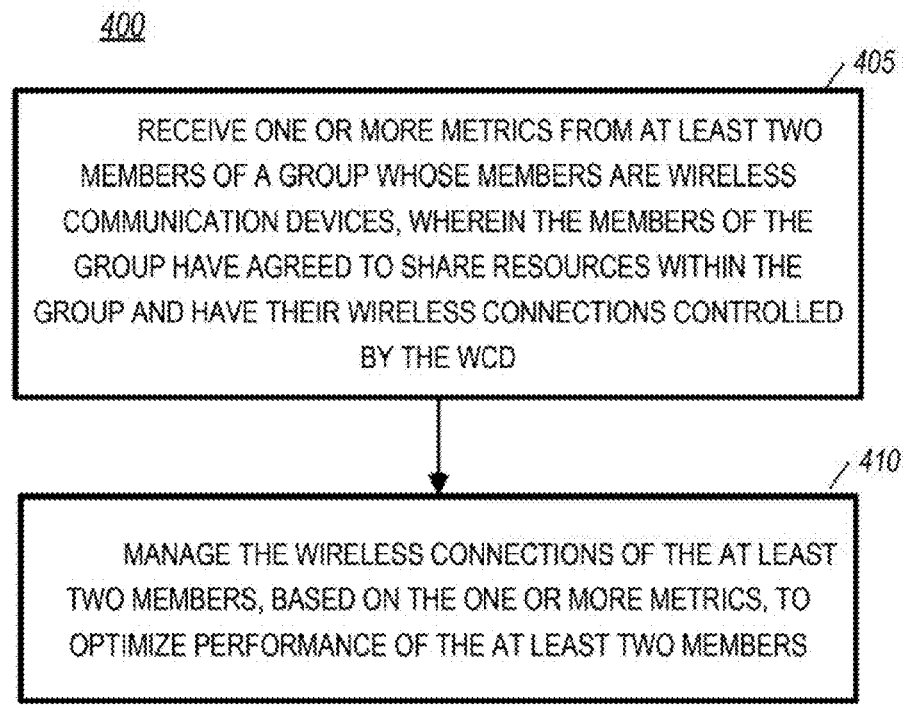
FIG. 4 is a flow chart that shows a method used in a wireless communication device, in accordance with certain embodiments.

Referring to FIG. 4, a flow chart 400 shows some steps of a method used by a wireless communication device (WCD), in accordance with certain embodiments. At step 405, one or more metrics are received by the WCD. The metrics are from at least two of the members of a group whose members are wireless communication devices (WCDs). The metrics include at least one temperature based metric. In addition to the temperature based metrics described above with reference to FIG. 3, other may be used. For example, a temperature characterization of a WCD may be sent to the WCD that is running the CMEA. This characterization may include a table of RFPA steady state temperature versus RFPA radiated power and frequency, or instead of the table, an identifier may be used to identify a temperature characterization table already within the CMEA. This may be needed when the WCDs in a group may be different types of WCDs.

The metrics may further include power based metrics. These may include, for example, RFPA radiated power, a present battery drain value, and battery state of charge. The battery state of charge may be expressed, for example, by a percentage of remaining charge or a battery cutback duration, A battery cutback duration may be a calculation that predicts how much time is left at the present discharge rate before power limits (such as display brightness, RFPA radiated power, or processing speed) will be imposed. As an example, the battery cutback duration can be determined from the present state of charge (SOC), the rate of discharge due to all power usage within the WCD, and the rate of external, imposed charging, and may be calculated as:

$$BatteryCutbackDuration = \frac{SOC_{Present} + RateofCharge}{RateofDischarge}$$

The members of the group have agreed to share resources within the group and have their wireless connections controlled by the WCD which is executing the CMEA. The WCD manages, at step 410, the wireless connections of the at least two members, based on the one or more metrics, to share the resources between the at least two members. To share, in this context, means to increase or decrease the consumption of resources by at least two of the WCDs in a group, with an expectation (e.g., a calculation) of improved overall consumption of resources within the group. The CME application may be resident within one of the at least two members. When a CME application is resident in more than one WCD, the selection of the CME to be activated for managing the group of WCDs may be made by user choice or by a user selecting a CME to make the choice using a CME selection routine of one CME that selects the managing CME by optimizing resources of the group. For example, power and/or memory metrics may be used to make the selection of the CME to control the group of WCDs. It will be appreciated that some WCDs may not have the capability to include a CME (e.g., "dumb" phones), but could be members of the group and benefit from the resource sharing that can take place.

Figure 5:
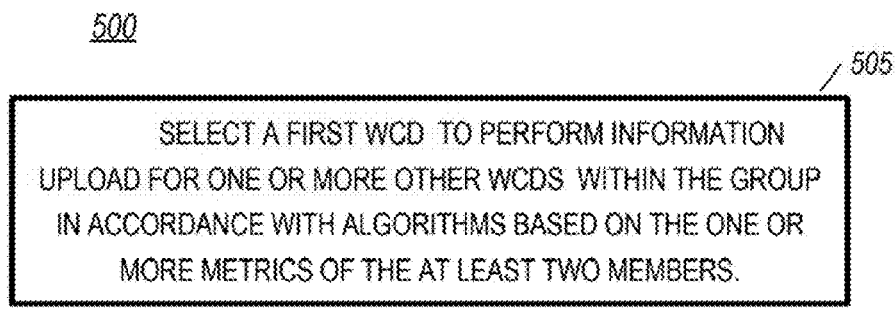
FIG. 5 is a flow chart that shows a step used in managing the wireless connections of the at least two members described with reference to FIG. 4, in accordance with certain embodiments.

Referring to FIG. 5, a flow chart 500 shows a step 505 of a method used by a wireless communication device (WCD), in accordance with certain embodiments. Step 505 is used in managing the wireless connections of the at least two members at step 410 of flow chart 400 (FIG. 4). Step 505 comprises selecting a first WCD to perform information upload for WCDs within the group in accordance with algorithms based on the one or more metrics of the at least two members. The selection is made by the WCD running the CMEA. For example the CMEA may receive present RFPA temperatures from several members of the group.

The several members may all be WCDs of the same type running a common game using a common wide area network. One WCD may have a substantially higher RFPA temperature than the others (giving inference that the WCD is operating near an edge of a cell). The CMEA optimizes the wireless connections by selecting a WCD with a low RFPA temperature and commands the WCD with the low RFPA temperature to act as an upload master for the group of WCDs. The optimization algorithm may base a selection based on other metrics, using machine learning, artificial intelligence techniques, and/or user prioritization. For example, the algorithm may weigh RFPA temperature and remaining battery charge and may select a WCD having a higher RFPA temperature but also a higher remaining battery charge over a WCD having the lowest RFPA temperature.

Figure 6:
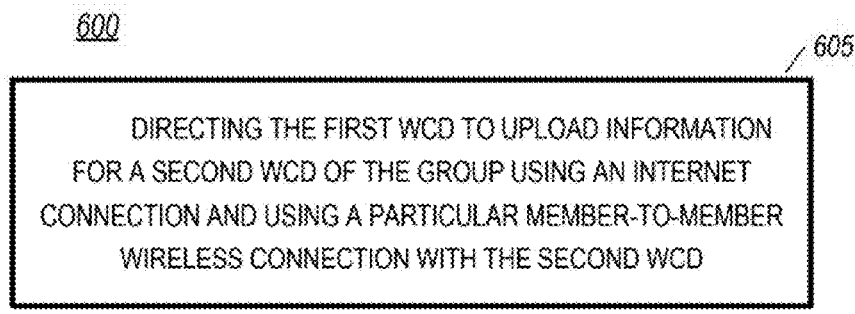
FIG. 6 is a flow chart that shows a step used in managing the wireless connections of the at least two members described with reference to FIG. 4, in accordance with certain embodiments.

Referring to FIG. 6, a flow chart 600 shows a step 605 of a method used by a wireless communication device (WCD), in accordance with certain embodiments. Step 605 is used in conjunction with step 505 (FIG. 5) to accomplish step 410 (FIG. 4) of managing the wireless connections of the at least two members. The first WCD is using an internet connection to an access point, for example, of a wide area network. Step 605 comprises directing the first WCD to upload information for a second member of the group using the internet connection using a member-to-member wireless connection with the second member. Continuing the example described with reference to FIG. 5, some of the group members are playing a graphics intensive game with each other. The WCDs may continue to receive their download information over wide area network wireless connections. In some embodiments (perhaps not gaming) other metrics may cause the CME to command the master upload (the first) WCD to handle all download information for the group as well. The WCDs in the group that are participating by using the first WCD for information upload and download are all directed by the first WCD as to which member-to-member connections to form that allow each WCD to route its information to and from the first WCD. In some cases the information routing may be through other WCDs of the group. Not all member-to-member wireless connections need be of the same type. The member-to-member wireless connection type may be dictated by the type or types available within each WCD.

In summary, then, the power and temperature aspects of the group of WCDs are optimized by managing the RF connections of the WCDs based at least on temperature based metrics. While the power and temperature of one or more WCDs may go up, the reduction of power and temperature in at least one other WCD achieves overall optimization.

Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 4-6, may be performed using programmed instructions contained on a computer readable medium which may be read by processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method used by a wireless communication device (WCD), comprising:
    receiving one or more metrics from at least two members of a group whose members are wireless communication devices, wherein the members of the group have agreed to share resources within the group and have their wireless connections controlled by the WCD; and
    managing the wireless connections of the at least two members, based on the one or more metrics, to optimize performance of the at least two members, wherein the one or more metrics comprise at least one temperature based metric and wherein the at least one temperature based metric comprises at least one of a radio frequency power amplifier (RFPA) temperature, an RFPA temperature threshold, an RFPA temperature rate of change, an RFPA temperature characterization, an RFPA temperature characterization identifier, and an RFPA temperature cutback duration.

2. The method according to claim 1, wherein the one or more metrics further comprise one or more power based metrics.

3. The method according to claim 2, wherein the power based metrics comprise at least one of a state of charge, a present battery drain value, and an RFPA power.

4. The method according to claim 1, wherein managing the wireless connection comprises determining a cutback duration based on metrics that include one or more of the following group of metrics: a present temperature of one or more components of the WCD, a present rate of temperature change of one or more components of the WCD, maximum temperature thresholds of one or more components of the WCD, a characterization of the power load of the RFPA versus the RF power output of the RFPA, and a thermal coefficients for the RFPA to the rest of the WCD.

5. The method according to claim 4, wherein the WCD comprises components that include one or more of a processor, a display, and an enclosure.

6. The method according to claim 1, wherein managing the wireless connections of the at least two members comprises:
    selecting a first WCD to perform information upload for one or more other WCDs within the group in accordance with one or more algorithms based on the one or more metrics of the at least two members.

7. The method according to claim 6, wherein the first WCD is using an internet connection to an internet access point and wherein managing the wireless connections of the at least two members further comprises:
    directing the first WCD to upload information for a second WCD of the group using the internet connection using a particular member-to-member wireless connection with the second WCD.

8. A wireless communication device (WCD), comprising:
a processing system; and
a transceiver, wherein the processing system includes program instructions that control the processing system to:
receiving one or more metrics from at least two members of a group whose members are wireless communication devices, wherein the members of the group have agreed to share resources within the group and have their wireless connections controlled by the WCD; and
managing the wireless connections of the at least two members, based on the one or more metrics, to optimize performance of the at least two members, wherein the one or more metrics comprise at least one temperature based metric and wherein the at least one temperature based metric comprises at least one of a radio frequency power amplifier (RFPA) temperature, an RFPA temperature threshold, an RFPA temperature rate of change, an RFPA temperature characterization, an RFPA temperature characterization identifier, and an RFPA temperature cutback duration.

9. The wireless communication device according to claim 8, wherein the one or more metrics further comprise one or more power based metrics.

10. The wireless communication device according to claim 9, wherein the power based metrics comprise at least one of a state of charge, a present battery drain value, and an RFPA power.

11. The wireless communication device according to claim 8, wherein managing the wireless connections comprises determining a cutback duration based on metrics that include one or more of the following group of metrics: a present temperatures of one or more components of the WCD, a present rate of temperature change of one or more components of the WCD, a maximum temperature thresholds of one or more components of the WCD, a characterization of the power load of the RFPA versus the RF power output of the RFPA, and a thermal coefficient for the RFPA to the rest of the WCD.

12. The wireless communication device method according to claim 8, wherein managing the wireless connections of the at least two members comprises:
selecting a first WCD to perform information upload for one or more other WCDs within the group in accordance with one or more algorithms based on the one or more metrics of the at least two members.

13. The wireless communication device according to claim 12, wherein the first WCD is using an internet connection to an internet access point and wherein managing the wireless connections of the at least two members further comprises:
directing the first WCD to upload information for a second WCD of the group using the internet connection and using a particular member-to-member wireless connection with the second WCD.

14. A method used by a wireless communication device (WCD), comprising:
receiving one or more metrics from at least two members of a group whose members are wireless communication devices, wherein the members of the group have agreed to share resources within the group and have their wireless connections controlled by the WCD; and
managing the wireless connections of the at least two members, based on the one or more metrics, to optimize performance of the at least two members, wherein the one or more metrics comprise at least one temperature based metric and
wherein managing the wireless connections of the at least two members comprises selecting a first WCD to perform information upload for one or more other WCDs within the group in accordance with one or more algorithms based on the one or more metrics of the at least two members.

15. The method according to claim 14, wherein the first WCD is using an internet connection to an internet access point and wherein managing the wireless connections of the at least two members further comprises:
directing the first WCD to upload information for a second WCD of the group using the internet connection using a particular member-to-member wireless connection with the second WCD.

16. A wireless communication device (WCD), comprising:
a processing system; and
a transceiver, wherein the processing system includes program instructions that control the processing system to:
receiving one or more metrics from at least two members of a group whose members are wireless communication devices, wherein the members of the group have agreed to share resources within the group and have their wireless connections controlled by the WCD; and
managing the wireless connections of the at least two members, based on the one or more metrics, to optimize performance of the at least two members, wherein the one or more metrics comprise at least one temperature based metric and wherein managing the wireless connections of the at least two members comprises selecting a first WCD to perform information upload for one or more other WCDs within the group in accordance with one or more algorithms based on the one or more metrics of the at least two members.

17. The WCD according to claim 16, wherein the first WCD is using an internet connection to an internet access point and wherein managing the wireless connections of the at least two members further comprises:
directing the first WCD to upload information for a second WCD of the group using the internet connection and using a particular member-to-member wireless connection with the second WCD.

\* \* \* \* \*